US012692947B2

(12) United States Patent
Vakilzadeh et al.

(10) Patent No.: US 12,692,947 B2
(45) Date of Patent: Jul. 28, 2026

(54) MULTI-PIECE SLIT VALVE GATE

(71) Applicant: Applied Materials, Inc., Santa Clara, CA (US)

(72) Inventors: Farzad Vakilzadeh, San Jose, CA (US); Shawn Thanhson Le, Manteca, CA (US); Ofer Amir, Half Moon Bay, CA (US); Ramon Zaragoza, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 36 days.

(21) Appl. No.: 18/797,067

(22) Filed: Aug. 7, 2024

(65) Prior Publication Data

US 2025/0060041 A1 Feb. 20, 2025

Related U.S. Application Data

(60) Provisional application No. 63/533,202, filed on Aug. 17, 2023.

(51) Int. Cl.
*F16K 3/02* (2006.01)
*F16K 3/18* (2006.01)
(Continued)

(52) U.S. Cl.
CPC .......... *F16K 3/0227* (2013.01); *F16K 3/0272* (2013.01); *F16K 3/0281* (2013.01);
(Continued)

(58) Field of Classification Search
CPC .... F16K 3/0227; F16K 3/0272; F16K 3/0281; F16K 3/18; F16K 3/314; F16K 51/02
See application file for complete search history.

(56) References Cited

U.S. PATENT DOCUMENTS 2,012,818 A * 8/1935 Hueber ................... G08B 3/06
340/404.3
2,870,987 A * 1/1959 Greenwood ............. F16K 3/12
251/327
(Continued)

FOREIGN PATENT DOCUMENTS

CN 210314460 U 4/2020
EP 0735574 A1 10/1996
(Continued)

OTHER PUBLICATIONS

International Search Report and Written Opinion for International Application No. PCT/US2024/042555, mailed Dec. 2, 2024, 9 Pages.

*Primary Examiner* — John Bastianelli
(74) *Attorney, Agent, or Firm* — Lowenstein Sandler LLP

(57) ABSTRACT

A slit valve gate includes a base portion, a seal portion, and a clamp portion. The base portion is configured to a slit valve actuator and includes a first angled alignment feature. The seal portion is coupled to the base portion. The seal portion is configured to create an airtight seal between the slit valve gate and a sealing surface of a slit valve opening. The clamp portion is coupled to the base portion. The clamp portion includes a second angled alignment feature configured to interface with the first angled alignment feature of the base portion to align the clamp portion with respect to the base portion. The clamp portion retains the seal portion at least partially between the clamp portion and the base portion.

20 Claims, 5 Drawing Sheets

(51) Int. Cl.
  *F16K 3/314*      (2006.01)
  *F16K 51/02*      (2006.01)

(52) U.S. Cl.
  CPC ............... *F16K 3/18* (2013.01); *F16K 3/314*
      (2013.01); *F16K 51/02* (2013.01)

(56)       References Cited

U.S. PATENT DOCUMENTS

| | | | | |
|---|---|---|---|---|
| 3,000,610 A | * | 9/1961 | Bryant | F16K 3/0227 |
| | | | | 251/327 |
| 4,474,358 A | * | 10/1984 | Bennett | F16K 1/46 |
| | | | | 251/900 |
| 5,013,009 A | * | 5/1991 | Nelson | F16K 3/12 |
| | | | | 251/328 |
| 5,579,718 A | * | 12/1996 | Freerks | F16K 51/02 |
| | | | | 118/733 |

| | | | | |
|---|---|---|---|---|
| 6,796,545 B2 | * | 9/2004 | Enzaki | F16K 25/00 |
| | | | | 251/363 |
| 6,932,354 B2 | * | 8/2005 | Kane | F16J 15/061 |
| | | | | 277/637 |
| 7,862,002 B2 | * | 1/2011 | Naitoh | F16K 31/1221 |
| | | | | 251/63.5 |
| 8,459,305 B2 | * | 6/2013 | Sutliff | F16K 1/2261 |
| | | | | 138/44 |
| 2009/0291207 A1 | | 11/2009 | Gochberg et al. | |
| 2011/0095218 A1 | * | 4/2011 | Schoch | F16K 51/02 |
| | | | | 251/157 |
| 2017/0213705 A1 | * | 7/2017 | Amir | H01J 37/32853 |
| 2017/0351275 A1 | * | 12/2017 | Ito | F16K 51/02 |

FOREIGN PATENT DOCUMENTS

| | | | |
|---|---|---|---|
| WO | 2017132002 A1 | 8/2017 | |
| WO | 2017132205 A1 | 8/2017 | |

* cited by examiner

200

Coupling a seal portion of a slit valve gate to a base portion of the slit valve gate.
510

Aligning a clamp portion of the slit valve gate with respect to the base portion.
520

Coupling a clamp portion of the slit valve gate to the base portion.
530

Depositing a protective coating on one or more of the base portion or the clamp portion.
540

MULTI-PIECE SLIT VALVE GATE

RELATED APPLICATIONS

This application claims the benefit of U.S. Provisional Patent Application No. 63/533,202 filed Aug. 17, 2023, the entire contents of which are incorporated by reference herein.

FIELD OF THE DISCLOSURE

Embodiments of the present disclosure relate generally to the field of substrate processing systems and specifically to a multi-piece slit valve gate.

BACKGROUND OF THE DISCLOSURE

Substrates are commonly processed in vacuum processing systems. These systems include one or more chambers, each performing substrate processing operations such as etching, chemical vapor deposition or physical vapor deposition, which can include heating or cooling of the substrate, and a plasma to assist the process. Typically, the environment within such processing chambers is maintained at a low sub-atmospheric pressure. Each chamber includes inlets and outlets for an evacuation apparatus and the admission of processing gases, as well as an aperture controlled by a slit valve to admit substrates. Such processing chambers may be in communication with a substrate transfer chamber, and the substrate transfer chamber may also have a valve-controlled aperture through which substrates can be admitted from outside the system.

The slit valves that open and close the apertures are typically housed within ports that are positioned between adjacent chambers. The ports typically house at least one gate that is coupled to an actuator used to manipulate it. The actuators can be pneumatic actuators that include one or more pistons for moving the gate from an open position (where the gate is not isolating one chamber from the adjacent chamber and the aperture is open) to a closed position (where the gate is isolating one chamber from the adjacent chamber and the aperture is closed) and vice versa.

SUMMARY OF THE DISCLOSURE

In certain embodiments, the instant disclosure is directed to a slit valve gate including a base portion configured to couple to a slit valve actuator and including a first angled alignment feature. The slit valve gate further includes a seal portion coupled to the base portion. The seal portion is configured to create an airtight seal between the slit valve gate and a sealing surface of a slit valve opening. The slit valve gate further includes a clamp portion coupled to the base portion. The clamp portion includes a second angled alignment feature configured to interface with the first angled alignment feature of the base portion to align the clamp portion with respect to the base portion. The clamp portion retains the seal portion at least partially between the clamp portion and the base portion.

In certain embodiments, the instant disclosure is directed to a slit valve including a slit valve opening, a slit valve actuator, and a slit valve gate coupled to the slit valve actuator. The slit valve gate is configured to seal the slit valve opening responsive to the slit valve actuator moving the slit valve gate to a closed position. The slit valve gate includes a base portion, a seal portion coupled to the base portion, and a clamp portion coupled to the base portion. The base portion includes a first angled alignment feature. The slit valve gate is coupled to the slit valve actuator via the base portion. The seal portion is configured to create an airtight seal between the slit valve gate and a sealing surface of the slit valve opening responsive to the slit valve actuator moving the slit valve gate to the closed position. The clamp portion includes a second angled alignment feature configured to interface with the first angled alignment feature of the base portion to align the clamp portion with respect to the base portion. The clamp portion retains the seal portion at least partially between the clamp portion and the base portion.

In certain embodiments, the instant disclosure is directed to a slit valve gate including a base portion configured to couple to a slit valve actuator. The slit valve gate further includes a seal portion coupled to the base portion. The seal portion is configured to create an airtight seal between the slit valve gate and a sealing surface of a slit valve opening. The slit valve gate further includes a clamp portion coupled to the base portion. The clamp portion retains the seal portion at least partially between the clamp portion and the base portion. At least one of the clamp portion of the base portion forms one or more first vent features configured to vent a region formed between the clamp portion and the base portion.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
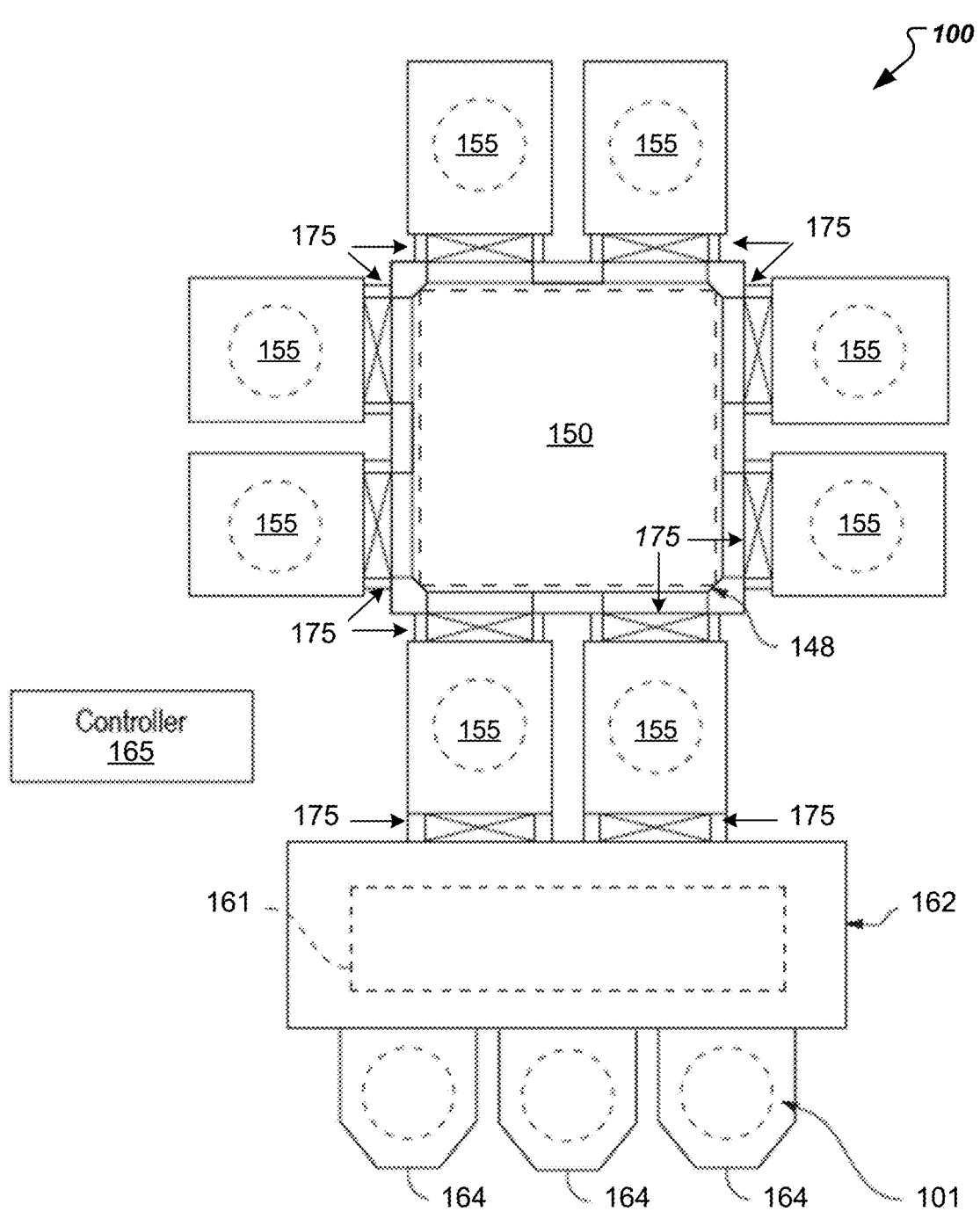
FIG. 1 illustrates a top schematic of a wafer processing system in accordance with embodiments of the present disclosure.

Semiconductor substrates and other substrates are commonly processed in vacuum processing systems and are transferred between one or more chambers through apertures controlled by slit valves assemblies. These slit valve assemblies typically include at least one gate coupled to an actuator used to manipulate the gate. The actuators can be full stroke pneumatic actuators that include one or more pistons for moving the gate from an open position (where the gate is not isolating one chamber from the adjacent chamber) to a closed position (where the gate is isolating one chamber from the adjacent chamber) and vice versa. Other types of actuators may also be used.

Slit valve assemblies typically include a seal that is bonded to a base portion of the gate. Conventionally, the seal is over-molded to the base portion. The seal of conventional slit valve gates thus cannot be easily replaced. When the seal of a conventional slit valve gate fails, the entire gate assembly is replaced. Additionally, because of the over-molded nature of conventional slit valve gate seals, adding a protective coating to the slit valve gate is difficult. For example, to apply a protective coating to a conventional slit valve gate, the sealing surface of the bonded seal is masked. Masking the bonded seal adds complexity and expense to the process of manufacturing the slit valve gate.

The instant disclosure is related to a multi-piece slit valve gate including a base portion, a seal portion, and a clamp portion. In some embodiments, the slit valve gate is configured to couple to a slit valve actuator via the base portion. A seal portion of the slit valve gate (e.g., a seal, an elastomer seal, etc.) is coupled to the base portion. When the actuator moves the slit valve gate to a closed position (e.g., moves the slit valve gate to cover and seal the slit valve opening), the seal is configured to create an airtight seal between the slit valve gate and a slit valve opening. The seal thus is to seal off the slit valve opening. The seal is retained in the base portion by the clamp portion. The clamp portion is coupled to the base portion (e.g., by one or more mechanical fasteners). The seal is retained between the clamp portion and the base portion. In some embodiments, an edge portion of the clamp portion retains the seal in a groove formed by the clamp portion and the base portion.

In some embodiments, the base portion includes a recess having an angled or tapered edge that forms an alignment feature. The clamp portion includes a corresponding angled or tapered edge that forms another alignment feature. In some embodiments, the alignment feature of the clamp portion interfaces with the alignment feature of the base portion to align the clamp portion with respect to the base portion when the clamp portion is coupled to the base portion. In some embodiments, when the clamp portion is aligned with the base portion (e.g., via the two interfacing angled alignment features) and coupled to the base portion, the clamp portion is substantially locked with the base portion.

In some embodiments, one or more vent features formed in the slit valve gate vent the region formed between the clamp portion and the base portion. A vent feature can be formed in the clamp portion or formed in the base portion. The one or more vent features may include a vent groove formed in the edge of the clamp feature and/or a vent hole formed in one or more hardware components (e.g., such as a fastener, etc.) that couples the clamp portion to the base portion. By including the one or more vent features, air does not become trapped the region between the clamp portion and the base portion during assembly or reassembly of the slit valve gate. Trapped air could affect the alignment of the clamp portion with respect to the base portion. Therefore, venting of the region between the clamp portion and the base portion allows the clamp portion to be accurately aligned with respect to the base portion upon assembly or reassembly of the slit valve gate. Moreover, trapped air between the clamp portion and the base portion can cause a virtual leak when pumping down the associated vacuum chamber. A "virtual leak" is the slow leaking of trapped gas (e.g., trapped air), causing a slow leak into the chamber and affecting pump down pressure. If air is trapped between the clamp portion and the base portion, the trapped air may leak into the vacuum chamber when the chamber is pumped down, adversely affecting vacuum pump performance.

By providing the multi-piece slit valve gate of the present disclosure, many advances can be realized. For example, the multiple pieces (e.g., the base portion, the clamp portion, etc.) of the slit valve gate described herein can be individually coated with a protective coating, unlike conventional slit valve gates. This allows a protective coating to be applied to the components of the slit valve gate that can optimize resistance to harmful gasses or environment to which the slit valve gate is exposed. The protective coating can be applied without the masking used for coating conventional slit valve gates. Additionally, the seal portion (e.g., the seal) of the slit valve gate described herein is capable of individual replacement (e.g., the seal can be replaced without replacing a remainder of the slit valve gate), unlike the seal of conventional slit valve gates. This allows for less equipment down time and less expense when compared to conventional slit valve gates. Furthermore, the slit valve gate described herein may provide increased sealing capabilities when compared to conventional slit valve gates. As an example, the multi-piece slit valve gate may better protect against contaminant ingress or egress at least in part because the seal portion can be replaced as soon as it begins to degrade, providing a better environment for substrate processing and reducing material consumption (e.g., gas, etc.) when compared to conventional slit valve gates. Moreover, the angled alignment features of the base portion and the clamp portion provide for a substantially locked connection between the clamp portion and base portion, reducing movement between the slit valve gate component and reducing particle generation. When the substantially locked connection is formed, sidewalls of the base portion and the clamp portion are in contact, such that there is substantially no gap between the base portion and the clamp portion. This may ensure that there is no play between the base portion and the clamp portion, which may ensure proper alignment of the components of the multi-piece slit valve gate.

FIG. 1 illustrates a top schematic of a substrate processing system 100 in accordance with embodiments of the present disclosure. Substrate processing system 100 may include a factory interface 162 (also referred to as "equipment front end module (EFEM)"), a main frame 150 (also referred to as a transfer chamber), one or more processing chambers 155, and one or more load lock chambers 156 according to embodiments described herein. Main frame 150 may be connected to factory interface 162 via the one or more load lock chambers 156. Substrate carriers 164 may be detachably connected to a front wall of the factory interface 162. Factory interface 162 may include a factory interface robot 161 for moving substrate 101 (shown dotted for illustration purposes) and/or other objects (such as process kit ring, etc.) between substrate carriers 164 and load lock chambers 156. For instance, factory interface 162 may include one or more load ports, each of which may receive a substrate carrier 164. An overhead track (OHT) may drop a front opening unified pod (FOUP) onto a load port. Factory interface robot 161 may pick substrate 101 from the FOUP and may optionally align substrate 101 in an aligner (not shown). Subsequently, factory interface robot 161 may place substrate 101 in load lock chamber 156. Thereafter, main frame robot 150 (located in main frame 150) may pick substrate 101 from at least one of load lock chambers 156 and hand substrate 101 to at least one of the one or more processing chambers 155.

As the manufacturing processes progress, the factory interface robot 161 and the main frame robot 150, working in tandem, may move substrates 101 and/or other objects between the substrate carriers 164 and the processing chambers 155. Various electronic device fabrication processes, e.g., semiconductor device manufacturing processes, such as, e.g., oxidation, thin film deposition, etching, heat treatment, degassing, cool down, etc., may take place within process chambers 155.

After processing in at least one of the one or more processing chambers 155 is complete, processed substrate 101 may be picked by main frame robot 150 and handed over to at least one of load lock chambers 156. At least one of load lock chambers 156 may pump its pressure up to atmospheric pressure followed by the processed substrate 101 being picked by the factory interface robot 161 and placed back into the FOUP. After all substrates from substrate carriers 164 are processed, the OHT (not shown) may pick the FOUP and drop it with a different tool as per the designed manufacturing process.

Substrate 101 and/or other objects are transferred between one station to an adjacent station (e.g., between main frame 150 to processing chamber 155, between load lock chamber 156 and main frame 150, between factory interface 162 and load lock chamber 156, and the like) via at least one gate that is a part of a slit valve assembly that may be housed in ports 175. A slit valve assembly according to certain embodiments is described in further detail with respect to FIG. 2. Each slit valve (or gate) is able to transition from a closed position to an open position and vice versa. In the closed position, the slit valve (or gate) isolates one station from an adjacent station. In the open position, the slit valve (or gate) does not isolate one station from the adjacent station and objects are transferable from one station to an adjacent station through the open apertures of two opposing sides of ports 175. The slit valve may include a multi-piece gate (e.g., the gate may include a seal portion coupled to a base portion) as described in some embodiments herein. In some embodiments, a clamp portion of the multi-piece gate is aligned with respect to a base portion of the multi-piece gate via interfacing angled alignment features to substantially lock the clamp portion with the base portion.

As used herein, the term "station" refers to a chamber in which objects that are transferred through a wafer processing system, such as a wafers, may be stored temporarily. A station, as used herein, may be separated from other portions of the substrate processing system with at least one gate.

Figure 2:
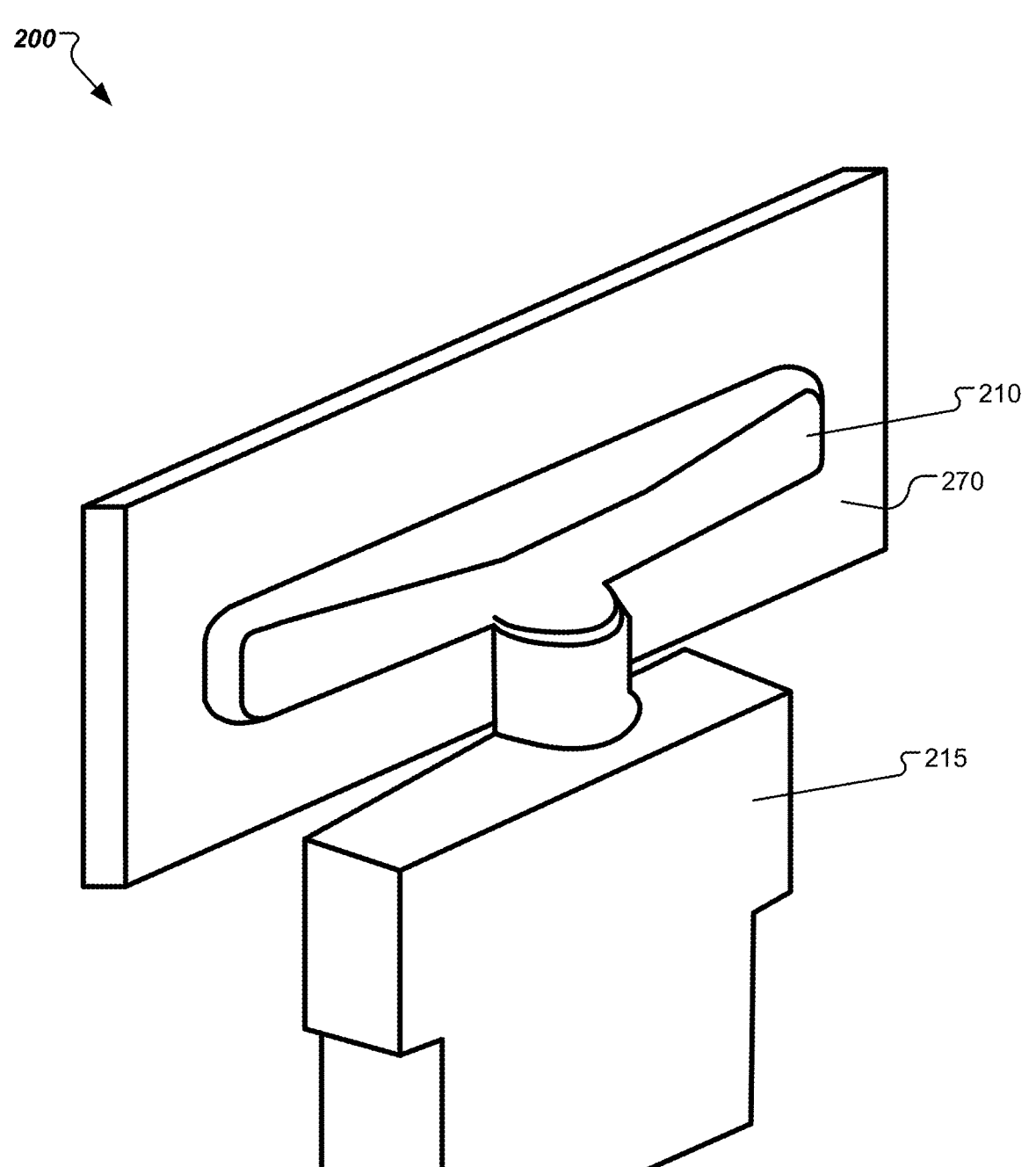
FIG. 2 illustrates a simplified perspective view of a slit valve apparatus in accordance with embodiments of the present disclosure.

FIG. 2 illustrates a simplified perspective view of a slit valve apparatus in accordance with embodiments of the present disclosure. The slit valve apparatus may include a slit valve assembly 200 that may be housed in port 175 depicted in FIG. 1. In certain embodiments, the slit valve apparatus includes a plurality of slit valve assemblies, each of the slit valve assemblies housed in one of ports 175.

In some embodiments, the slit valve assembly 200 includes at least one gate 210 configured to transition between an open position and a closed position (e.g., as shown in FIG. 2). Slit valve assembly 200 may further include a slit valve control mechanism that includes at least one actuator 215 coupled to the gate 210 via a movable member. The actuator 215 may be configured to exert force on the gate 210. In some embodiments, the actuator 215 is a pneumatic actuator configured to pneumatically move gate 210 from an open position to a closed position or vice versa. In some embodiments, the actuator 215 is an electric actuator, a mechanical actuator, or other type of actuator.

While in the closed position (e.g., as shown in FIG. 2), the slit valve gate 210 may seal an opening formed in surface 270. The opening formed in surface 270 may be a slit valve opening as described herein. A seal portion of the gate 210 may interface with a sealing surface of the surface 270 to create an airtight seal. In some embodiments, the seal portion may elastically deform when the actuator 215 moves the gate 210 to the closed position. The elastic deformation of the seal portion may create the airtight seal described herein. The airtight seal may guard against contaminants or gasses from passing through the slit valve opening.

Figure 3A:
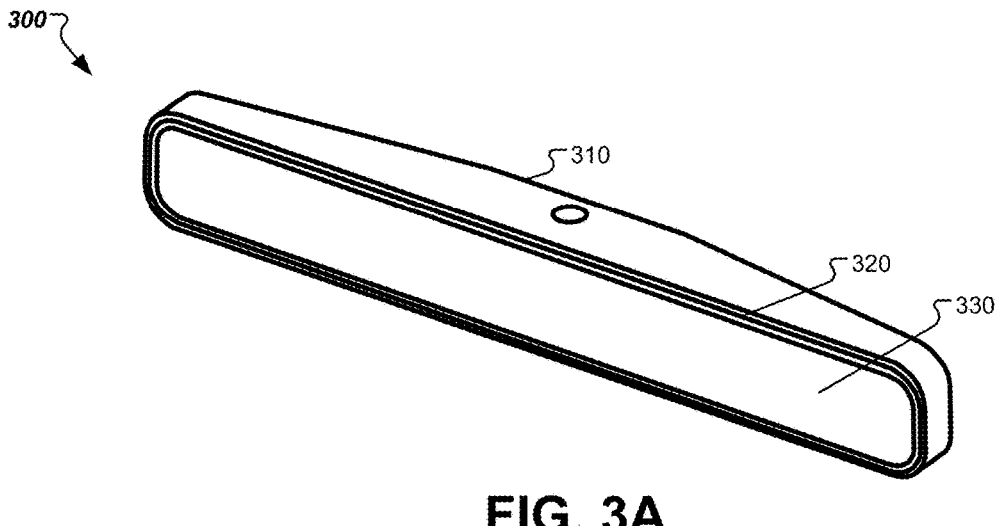
FIG. 3A illustrates a simplified perspective of a slit valve gate in accordance with embodiments of the present disclosure.
Figure 3B:
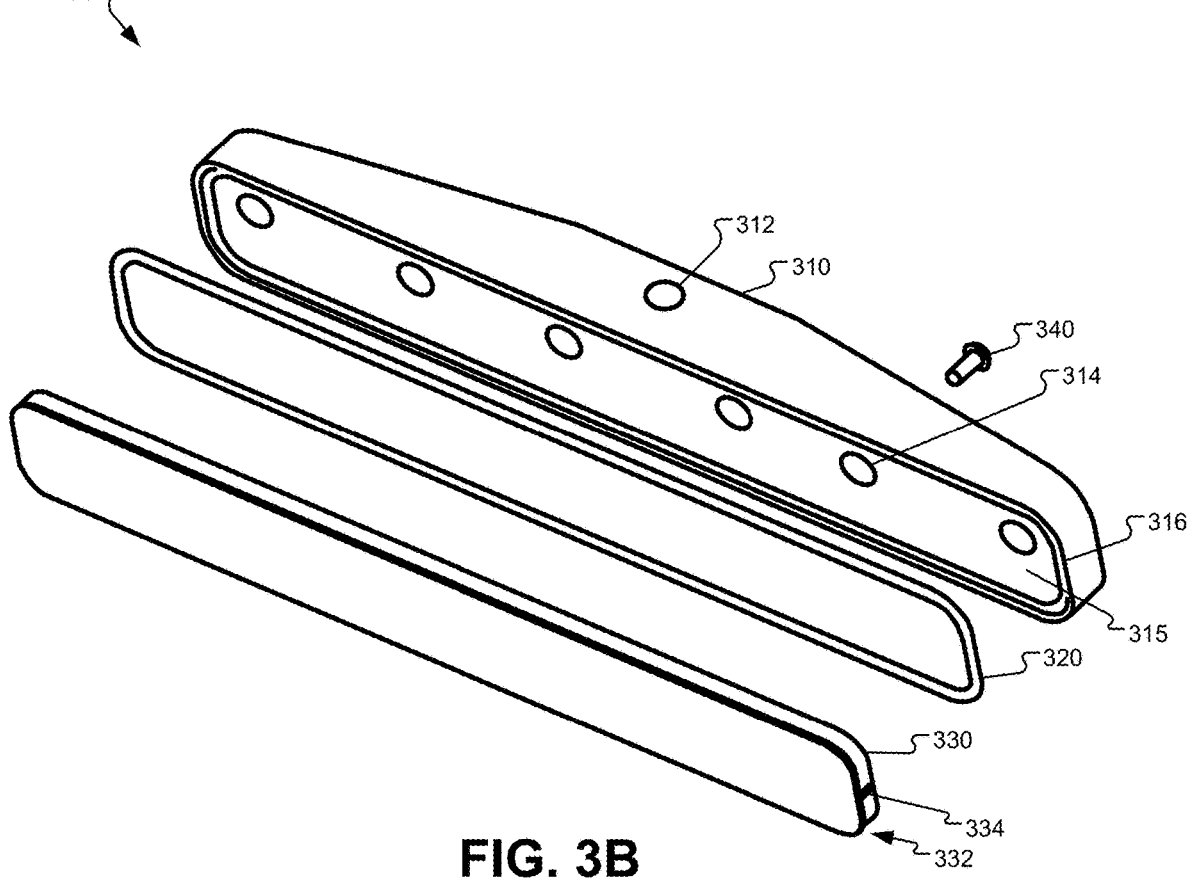
FIG. 3B illustrates a simplified perspective view of a disassembled slit valve gate in accordance with embodiments of the present disclosure.

FIG. 3A illustrates a simplified perspective view of a slit valve gate 300 in accordance with embodiments of the present disclosure. FIG. 3B illustrates a simplified perspective view of a disassembled slit valve gate 300 in accordance with embodiments of the present disclosure. In some embodiments, the slit valve gate 300 includes a base portion 310, a seal portion 320 (e.g., a seal), and/or a clamp portion 330. In many embodiments, the slit valve gate 300 is configured to couple to a slit valve actuator (e.g., actuator 215 of FIG. 2). In some examples, the base portion 310 may be configured to couple to an actuator (e.g., directly or indirectly via a movable member) via a mounting interface 312. In some embodiments, the mounting interface 312 is or includes a hole and/or recess formed in the base portion 310.

The base portion may include a lip 316 around a recess 315. The recess 315 may be configured to accept the clamp portion 330. In some embodiments, the base portion 310 forms multiple holes 314 through which fasteners 340 may pass to secure (e.g., fasten, etc.) the clamp portion 330 to the base portion 310. In some embodiments, each of the holes 314 are surrounded by a seal (e.g., an o-ring seal) to seal the holes 314. The clamp portion 330 may form corresponding holes (e.g., corresponding to holes 314) to receive fasteners 340. In some embodiments, the clamp portion 330 couples to the base portion 310 via one or more fasteners 340. In some embodiments, fastener 340 is a screw, a bolt, or another threaded fastener. In certain embodiments, the clamp portion 330 couples to the base portion 310 by a welded joint, a soldered joint, and/or a brazed joint.

In some embodiments, the slit valve gate 300 includes one or more vent features to vent a region formed between the clamp portion 330 and the base portion 310. For example, and in some embodiments, the clamp portion 330 forms one or more vent grooves 334. The one or more vent grooves 334 may vent the region between the clamp portion 330 and the base portion 310 so that air does not become trapped between the clamp portion 330 and the base portion 310, such as during assembly or reassembly of the slit valve gate 300. In some embodiments, a first vent groove 334 is formed at a first distal end of the clamp portion 330 and a second vent groove 334 is formed at an opposite second distal end of the clamp portion 330. In some embodiments, the one or more fasteners 340 include respective vent holes to similarly vent the region formed between the clamp portion 330 and the base portion 310. In some embodiments, the vent groove 334 has a width between approximately 0.1 millimeters and approximately 10 millimeters. In some embodiments, the vent groove 334 has a width between approximately 1 millimeter and approximately 5 millimeters. In some embodiments, the vent groove 334 has a width between approximately 2 millimeters and approximately 4 millimeters. In some embodiments, the vent groove 334 has a depth between approximately 0.5 millimeters and approximately 5 millimeters. In some embodiments, the vent groove 334 has a depth between approximately 1 millimeter and approximately 3 millimeters. In some embodiments, the vent groove 334 has a depth between approximately 1.5 millimeters and approximately 2 millimeters.

In some embodiments, the base portion 310 forms a first angled alignment feature at or around the periphery of recess 315. The first angled alignment feature may interface with a corresponding second alignment feature that extends around the periphery the clamp portion 330. In some embodiments, the recess 315 includes an angled edge that forms the first angled alignment feature and the clamp portion 330 includes a similar angled edge that forms the second angled alignment feature. In some embodiments, the angled edges of the clamp portion 330 and the recess 315 are placed in abutment when the clamp portion 330 is coupled to the base portion 310. In some embodiments, abutment of the angled edges that form the first and second alignment features align the clamp portion 330 to the base portion 310. In some embodiments, the first and second alignment features align the clamp portion 330 with respect to the base portion 310 in at least two dimensions (e.g., horizontally and vertically, etc.).

In some embodiments, the clamp portion 330 is configured to retain the seal portion 320. An edge 332 (e.g., of the clamp portion 330) and the lip 316 (e.g., of the base portion 310) may retain the seal portion 320. The edge 332 may extend from a surface of the clamp portion 330 around an outer periphery of the clamp portion 330. In some embodiments, the edge 332 and the lip 316 may substantially form a groove to retain the seal portion 320 when the clamp portion 330 is coupled to the base portion 310. In some embodiments, the lip 316 and the edge 332 together form a dovetail groove, as described herein below. In some embodiments, the lip 316 and edge 332 may together form a groove having other cross-sectional shapes, such as an inverted T-shaped groove, an L-shaped groove, a hemispherical groove, a circular groove, and so on.

In some embodiments, the seal portion 320 is an elastomer seal. The seal portion 320 may be made of a material such as rubber, silicone, plastic, expanded foam, fluoroelastomer, or another suitable polymer and/or elastomer. The seal portion 320 may have a cross-sectional profile as described herein below (e.g., with reference to FIGS. 4A-4B). In some embodiments, the seal portion 320 may have a circular profile (e.g., similar to an o-ring). Alternatively, the seal portion 320 may have other cross-sectional profiles, such as an inverted T-shape, an L-shape, a hemispherical shape, a circular shape, and so on. In some embodiments, the seal portion 320 may be hollow (e.g., may form an inner cavity). Including an inner cavity within the seal portion 320 may cause the seal portion 320 to be more flexible when compared to seals that do not include an inner cavity (e.g., are solid). In some embodiments, the seal portion 320 may at least partially compress when pushed against a sealing surface (e.g., when an actuator moves the slit valve gate 300 to a closed position) and may form an airtight seal. In some embodiments, the seal portion 320 may substantially fill a groove (e.g., a dovetail groove) formed by the clamp portion 330 and the base portion 310.

In some embodiments, the base portion 310 and/or the clamp portion 330 are made of a material selected from a group including aluminum, steel alloy, stainless steel, nickel alloy, titanium, ceramic, and/or plastic. The base portion 310 and the clamp portion 330 may be made of dissimilar materials. In some examples, the base portion 310 may be made of aluminum while the clamp portion 330 is made of stainless steel. The material of the base portion 310 and/or the material of the clamp portion 330 may be selected based on a particular coating to be applied to each of the components and/or based on the environment each of the components may be exposed to (e.g., a corrosive environment, a plasma environment, etc.). The material of the base portion 310 and/or the material of the clamp portion 330 may be selected to have complimentary coefficients of thermal expansion. In some examples, the base portion 310 is made of a material having a similar (e.g., substantially similar) coefficient of thermal expansion of the material of the clamp portion 330. In some embodiments, at least one surface of the base portion 310 and/or at least one surface of the clamp portion 330 are polished. In some examples, a surface of the base portion 310 and/or a surface of the clamp portion is electro-polished.

In some embodiments, the base portion 310 and/or the clamp portion 330 include a coating (e.g., a protective coating). The coating may cover at least one surface of the base portion 310 and/or at least one surface of the clamp portion 330. In some embodiments, the coating is a corrosion-resistant protective coating and/or a plasma-resistant protective coating. In some embodiments, the coating is a nickel-plated coating, and/or an anodized coating. The coating may be an electro-plated coating. In some embodiments, the coating is an oxidation coating. The coating may be selectively applied to either the base portion 310 or the clamp portion 330. In some examples, the base portion 310 includes a first coating and the clamp portion 330 includes a second coating. The first coating may be different from the second coating, in some embodiments. The coating may be optimized for the environment in which the slit valve gate is to operate.

In some embodiments, the coating is deposited using, for example, a technique such as atomic layer deposition (ALD), ion assisted deposition (IAD), plasma spray (PS), low pressure plasma spray (LPPS), chemical vapor deposition (CVD), plasma spray chemical vapor deposition (PS-CVD), sputtering, combinations thereof, or other techniques or modifications thereof suitable for forming conformal coatings. In some embodiments, the coating comprises a ceramic material that is resistant to corrosion by process gases or reactive species. For example, in some embodiments, the coating may comprise a plasma-resistant ceramic coating comprising a rare-earth ceramic selected from $Y_2O_3$, $YZrO$, $Y_xZr_yO_z$, $YZrOF$, $Y_3Al_5O_{12}$, $Y_4Al_2O_9$, $YF_3$, $Y_xO_yF_z$, $YOF$, $Er_2O_3$, $Er_3Al_5O_{12}$, $ErF_3$, $E_xO_yF_z$, $ErOF$, $La_2O_3$, $Lu_2O_3$, $Sc_2O_3$, $ScF_3$, $ScOF$, $Gd_2O_3$, $Sm_2O_3$, $Dy_2O_3$, a $Y_2O_3$—$ZrO_2$ solid solution, a ceramic comprising $Y_2Al_4O_9$ and a $Y_2O_3$—$ZrO_2$ solid solution, an amorphous phase containing a mixture of $Al_2O_3$ and $Y_2O_3$, or combinations thereof.

In some embodiments, the coating comprises $Al_2O_3$. In one embodiment, the coating comprises $Al_2O_3$ deposited by atomic layer deposition (ALD).

In some embodiments, the coating is substantially uniform in thickness, conformal to the underlying surface that is being coated, porosity-free, has no cracks, acts as a diffusion barrier for metal contaminants, and has high purity (e.g., greater than about 99% purity, or greater than about 99.95% purity). In certain embodiments, ALD may be advantageously used to coat all dimensions of the sensor assembly. In some embodiments, the coating is resistant cracking and/or delamination at various temperatures (such as up to 350° C.).

In certain embodiments, the coating may have a uniform thickness with a thickness variation of less than about +/−20%, a thickness variation of less than about +/−10%, a thickness variation of less than about +/−5%, or a lower thickness variation when comparing the thickness of the coating in one location to the thickness of the coating in another location (or when comparing the thickness of the coating in one location as compared to the average thickness of the coating, or when assessing the standard deviation of the thickness of the coating across several locations).

In certain embodiments, the coating may be conformal to the underlying surface that is being coated, including underlying surface features and/or complex geometrical shapes and/or portions coated which have high aspect ratios. For instance, the coating may conformally and uniformly coat portion that have high aspect ratios, e.g., length:width (L:W) or length:diameter (L:D), ranging from about 2:1 to about 500:1, from about 5:1 to about 300:1, from about 10:1 to about 150:1, from about 15:1 to about 100:1, or from about 20:1 to about 50:1.

In certain embodiments, the coating may be very dense and have a very low porosity, such as, a porosity of less than about 1%, less than about 0.5%, less than about 0.1%, or porosity-free (porosity of 0%). In certain embodiments, the coating may have a crack free microstructure, hermetic, and have a high dielectric breakdown resistance.

In certain embodiments, the coating may be deposited at a low deposition temperature, e.g., a deposition temperature up to 350° C., which may allow its use with a wide variety of materials.

Figure 4B:
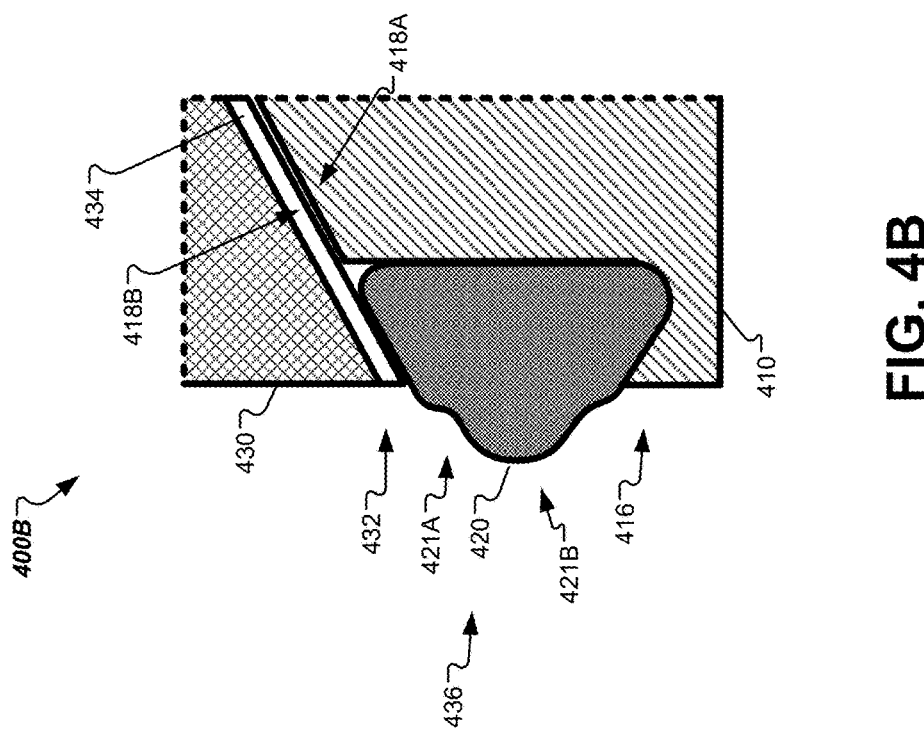
FIGS. 4A-4B illustrate cross-sectional views of a slit valve gate in accordance with embodiments of the present disclosure.
Figure 4A:
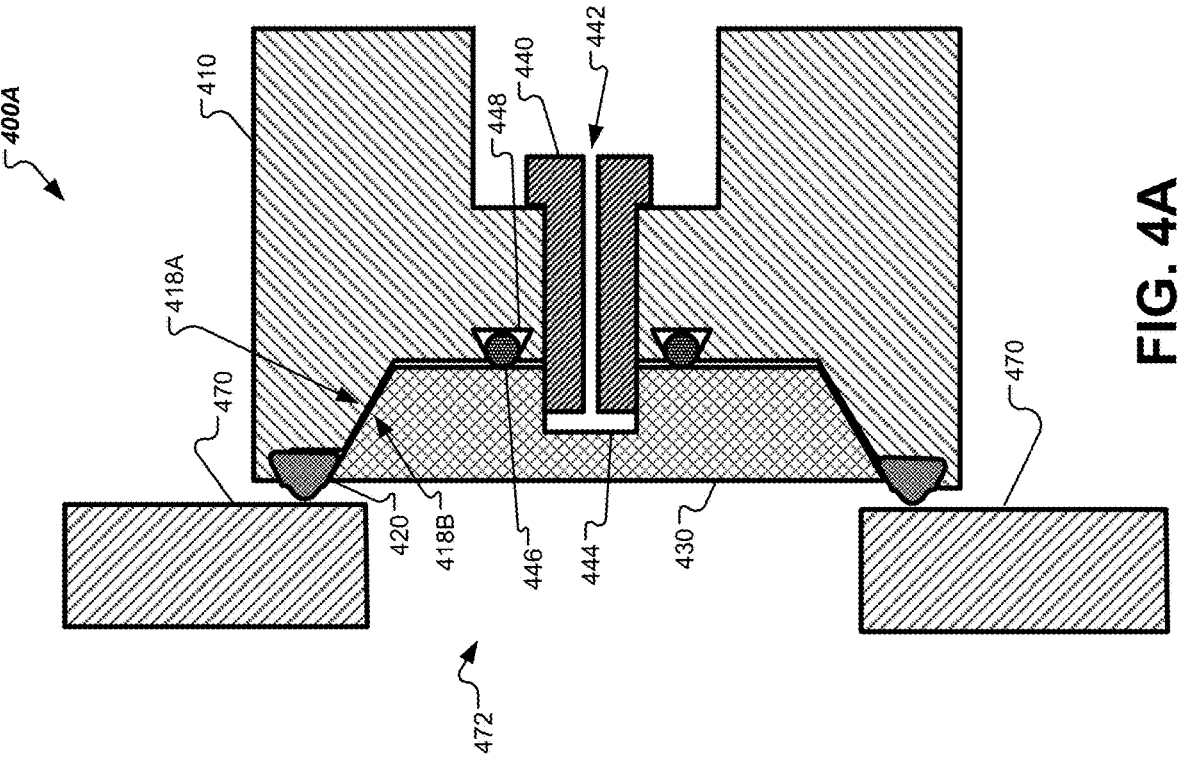

FIGS. 4A-4B illustrate cross-sectional views of a slit valve gate in accordance with embodiments of the present disclosure. FIG. 4A may illustrate a slit valve gate 400A in a closed position. FIG. 4B may illustrate a detailed view of a groove 436 of a slit valve gate 400B. Some of the features in FIGS. 4A-4B that have similar reference numbers as those in other figures may have similar properties, functions, and/or structures as those in FIGS. 4A-4B.

Referring to FIG. 4A, a clamp portion 430 and a base portion 410 of the slit valve gate 400A may retain a seal portion 420. The seal portion 420 may abut a sealing surface 470 that surrounds a slit valve opening 472 (e.g., when the slit valve gate 400A is in a closed position). The seal portion 420 may create an airtight seal responsive to the slit valve gate 400A being moved to a closed position (e.g., by an actuator). In some embodiments, the base portion 410 may correspond to base portion 310 of FIGS. 3A-3B, the seal portion 420 may correspond to seal portion 320 of FIGS. 3A-3B, and/or the clamp portion 430 may correspond to clamp portion 330 of FIGS. 3A-3B.

In some embodiments, base portion 410 includes a recess that is to accept the clamp portion 430. In some embodiments, the recess formed in the base portion 410 includes a first angled edge 418A and clamp portion 430 includes a second angled edge 418B. The angled edge 418B may extend from a bottom to a top of clamp portion 430. Similarly, the angled edge 418A may extend from a bottom of the recess to a receiving area for seal portion 420. In some embodiments, the first angled edge 418A is angled inward with respect to the center of the base portion 410 (e.g., such that the cross-sectional width of the recess is wider at the top than at the bottom, etc.). In some embodiments, the second angled edge 418B is angled outward with respect to the center of the clamp portion 430 (e.g., such that the cross-sectional width of the clamp portion 430 is wider at the top than at the bottom, etc.). In some embodiments, the first and second angled edges 418A and 418B may form an angle with respect to the of clamp portion 430 (e.g., the left side of clamp portion 430 as shown in FIG. 4A) and/or to the bottom face of the recess of base portion 410 between approximately 15 degrees and approximately 75 degrees. In some embodiments, the angled edges 418A and 418B may form an angle with respect to the face of the clamp portion 430 and/or to the bottom face of the recess of base portion 410 between approximately 25 degrees and approximately 65 degrees. In some embodiments, the angled edges 418A and 418B may form an angle with respect to the face of the clamp portion 430 and/or to the bottom face of the recess of base portion 410 between approximately 40 degrees and approximately 50 degrees. In some embodiments, the angled edges 418A and 418B may form approximately a 45 degree angle with respect to the face of the clamp portion 430 and/or to the bottom face of the recess of base portion 410.

In some embodiments, the clamp portion 430 has a substantially trapezoidal cross-section formed at least in part by the second angled edge 418B extending around the periphery. In some embodiments, first and second angled edges 418A and 418B are substantially linear. In some embodiments, first and second angled edges 418A and 418 are curved. In some embodiments, first and second angled edges 418A and 418B have a substantially matching curve. In some embodiments, the first and second angled edges 418A and 418B may abut one another when the clamp portion 430 is coupled to the base portion 410. In some embodiments, the first angled edge 418A extends around the periphery of the recess and the second angled edge 418B extends around the periphery of the clamp portion 430. In some embodiments, abutment of the first and second angled edges 418A and 418B causes the clamp portion 430 to become aligned with respect to the base portion 410.

In some embodiments, a fastener 440 (e.g., such as a threaded fastener, etc.) couples the clamp portion 430 to the base portion 410. A hole 414 formed in the clamp portion 430 may accept a first distal end of the fastener 440. The fastener 440 may include a vent hole 442. The vent hole 442 may extend from the first distal end of the fastener 440 to a second distal end of the fastener 440. The vent hole 442 may vent the hole 444 so that air does not become trapped within the hole 444, such as during assembly or reassembly of the slit valve gate 400. In some embodiments, a seal such as an o-ring seal 446 surrounds the hole 444. The o-ring seal 446 may fit into a groove 448 formed in the base portion 410. In some embodiments, the groove 448 is a dovetail groove.

Referring to FIG. 4B, an edge 432 of the clamp portion 430 may, together with a lip 416 of the base portion 410, retain the seal portion 420 in a groove 436. In some embodiments, edge 432 forms at least a portion of the clamp portion 430. In some embodiments, the clamp portion 430 together with the base portion 410 substantially form a groove (e.g., groove 436) when the clamp portion 430 is coupled to the base portion 410. In some examples, the base portion 410 forms a first part of the groove 436 and the clamp portion 430 forms a second part of the groove 436. In some examples, the edge 432 forms a part (e.g., a first wall) of the groove 436 and the lip 416 forms another part (e.g., an opposing second wall) of the groove 436. The groove 436 may be a dovetail groove, as illustrated in FIG. 4B and described herein, or may have another cross-sectional shape as described herein. The seal portion 420 may substantially conform to the groove 436.

In some embodiments, the clamp portion 430 forms a vent groove 434. The vent groove may vent the region formed between the clamp portion 430 and the base portion 410 so that air does not become trapped between the clamp portion 430 and the base portion 410, such as during assembly or reassembly of the slit valve gate 400. The sides of the vent groove 434 may partially form the second angled edge 418B.

In some embodiments, the seal portion 420 has an approximately trapezoidal cross-section. In some embodiments, the seal portion 420 has an approximately triangular cross-section. In some embodiments, the seal portion 420 has an approximately T-shaped cross-section. In some embodiments, the seal portion 420 has a circular (e.g., substantially circular) cross-section. The cross-section of the seal portion 420 may have substantially rounded corners. The cross-section of the seal portion 420 may include two rounded shoulders 421A in some embodiments. A rounded protrusion 421B may protrude from the rounded shoulders 421A. The rounded protrusion 421B may make contact with the sealing surface 470 when the slit valve gate is moved to a closed position. The seal portion 420 may substantially fill a groove formed by the base portion 410 and the clamp portion 430 (e.g., a groove formed by lip 416 and edge 432), and may include a portion that protrudes above the surface of the clamp portion 430. In some examples, the cross-sectional shape of the seal portion 420 conforms (e.g., substantially conforms) to the groove 436 formed by the base portion 410 and the clamp portion 430.

Figure 5:
FIG. 5 is a flow chart of a method of manufacturing a slit valve gate in accordance with embodiments of the present disclosure.
Figure 5:
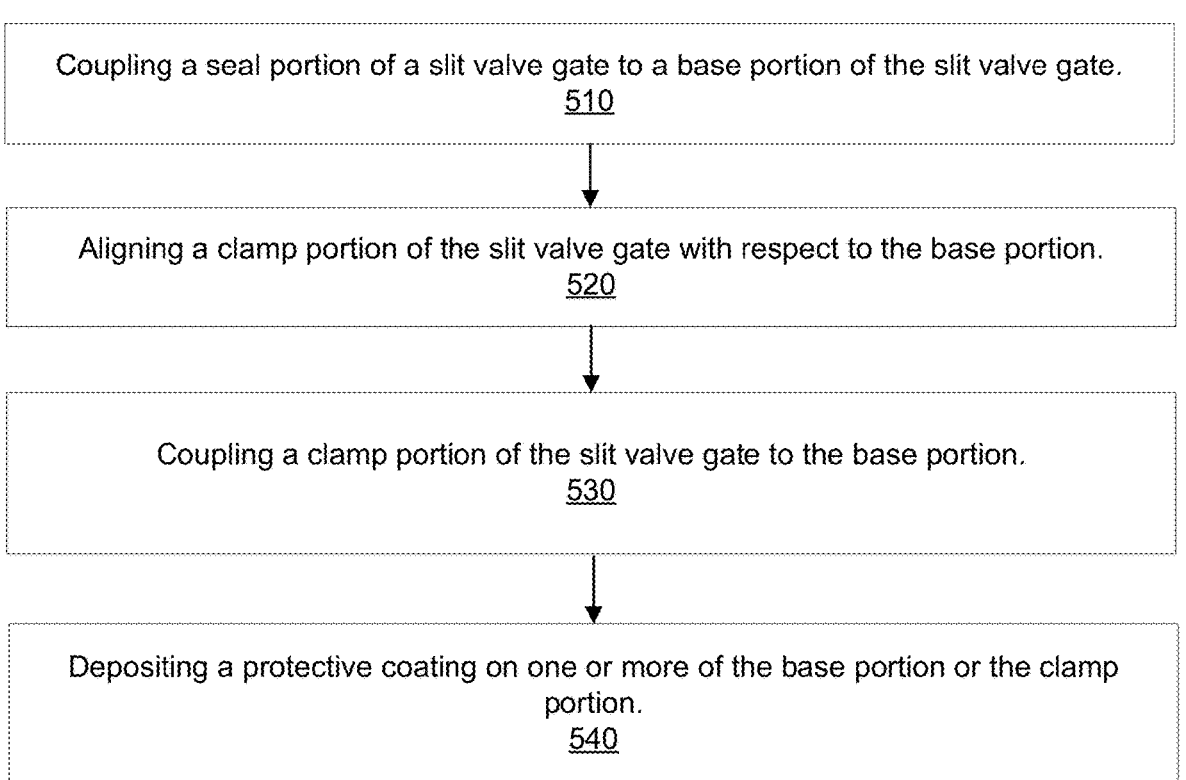

FIG. 5 is a flow chart of a method 500 of manufacturing a slit valve gate in accordance with embodiments of the present disclosure. In some embodiments, method 500 may be performed by machinery (e.g., assembly machinery, robotic machinery, etc.) and/or by a technician (e.g., a user, an engineer, an assembler, a human, etc.). In some embodiments, method 500 is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof.

For simplicity of explanation, method 500 is depicted and described as a series of operations. However, operations in accordance with this disclosure can occur in various orders and/or concurrently and with other operations not presented and described herein. Furthermore, in some embodiments, not all illustrated operations are performed to implement method 500 in accordance with the disclosed subject matter. In addition, those skilled in the art will understand and appreciate that method 500 could alternatively be represented as a series of interrelated states via a state diagram or events.

At block 510, a seal portion (e.g., a seal) of a slit valve gate is coupled to (or inserted into or placed against) a base portion of the slit valve gate (e.g., as described herein). The seal portion may correspond to seal portion 320 of FIGS. 3A-3B and/or seal portion 420 of FIGS. 4A-4B. In some embodiments, the seal is inserted into a groove (e.g., a part of a groove) formed by the base portion. In some examples, the seal may be inserted into a part of a dovetail groove formed by a lip (e.g., lip 316 of FIG. 3B) proximate an outer periphery of the base portion (e.g., base portion 310 of FIGS. 3A-4B). A surface of the base portion may be coated by a protective coating prior to coupling seal portion to the base portion.

At block 520, a clamp portion of the slit valve gate is aligned with respect to the base portion. In some embodiments, a first angled alignment feature (e.g., first angled edge 418A of FIGS. 4A-4B) and a second angled alignment feature (e.g., second angled edge 418B of FIGS. 4A-4B) are interfaced with one another so align the clamp portion with respect to the base portion. In some embodiments, aligning the clamp portion with respect to the base portion via the first and second angled alignment features substantially locks the clamp portion with the base portion so that the clamp portion cannot move relative to the base portion in at least one plane.

At block 530, a clamp portion of the slit valve gate is coupled to the base portion. The clamp portion (e.g., clamp portion 330 of FIGS. 3A-3B) may be coupled to the base portion (e.g., base portion 310 of FIGS. 3A-3B) by one or more fasteners (e.g., fastener 340 of FIG. 3B). In some embodiments, the clamp portion may be coupled to the base portion by a joint such as a welded joint, a brazed joint, and/or a soldered joint. In some embodiments, the clamp portion is coupled to the base portion by an adhesive. In some embodiments, the clamp portion fits into a recess (e.g., recess 315 of FIG. 3B) formed in the base portion. The edge of the recess may include an angled surface that forms the first aligning feature (e.g., at block 520) which interfaces with another angled surface that extends around the periphery of the clamp portion to form the second aligning feature (e.g., at block 520). A surface of the clamp portion may be coated by a protective coating prior to coupling the clamp portion to the base portion. Coupling the clamp portion to the base portion may secure the seal portion between a lip of the base portion and a lip of the clamp portion such that a part of the seal portion protrudes above the clamp portion, providing a seal surface.

At block 540, a protective coating may be deposited on one or more of the base portion or the clamp portion. In some embodiments, the protective coating is deposited prior to coupling the clamp portion to the base portion and/or prior to coupling the seal portion to the base portion.

Coatings (e.g., metal layers, electrode layers, dielectric layers, dielectric sleeves, etc.) according to embodiments described herein may be formed using a deposition process selected from chemical vapor deposition (CVD), plasma enhanced chemical vapor deposition (PECVD), physical vapor deposition (PVD), plasma enhanced physical vapor deposition (PEPVD) and atomic layer deposition (ALD). CVD is a well-known technique for depositing pure metal coatings. In a typical CVD process, a substrate is exposed to at least one volatile precursor under ultra-high vacuum conditions. The at least one precursor reacts or decomposes on the substrate surface to form a film. The reaction chamber is subsequently purged with inert gas flowing there-through. In a PECVD process, chemical reactions are initiated by the creation of a plasma of the reactive precursor gases. In an ALD process, a thin film layer is grown by repeatedly exposing the surface of a substrate to pulses of gaseous chemical precursors that chemically react with the surface one at a time in a self-limiting manner. CVD and ALD are non-line-of-sight processes that may be used to coat high aspect ratio features. A PVD process also takes place under vacuum conditions and typically involves sputtering and/or evaporation of a target material to form a gas that deposits and/or reacts on a surface of the substrate. PVD (typically, including evaporation, plasm spray, etc.) is a line-of-sight process. In a PEPVD process (typically, including ion assisted deposition, ion assisted evaporation deposition, ion assisted sputtering deposition, ion plating, etc.), the plasma or energetic ions are generated to react with deposition materials from the PVD processes, such as the ion beams, and involve sputtering or evaporation of target materials. PEPVD is a line-of-sight process, but can be modified as a non-line-of-sight process in cases where the substrate is biased during the deposition processes. As compared to ALD, PVD and PEPVD can deposit a relatively thick coating (up to about 500 μm, or up to about 250 μm, or from about 5 μm to about 250 μm) at a relatively low deposition temperature (<200° C.).

In some embodiments, the coating is deposited using one or more of ALD, IAD, LPPS, CVD, PS-CVD, or sputtering.

In some embodiments, the coating comprises a rare-earth ceramic selected from $Y_2O_3$, $YZrO$, $Y_xZr_yO_z$, $YZrOF$, $Y_3Al_5O_{12}$, $Y_4Al_2O_9$, $YF_3$, $Y_xO_yF_z$, $YOF$, $Er_2O_3$, $Er_3Al_5O_{12}$, $ErF_3$, $E_xO_yF_z$, $ErOF$, $La_2O_3$, $Lu_2O_3$, $Sc_2O_3$, $ScF_3$, $ScOF$, $Gd_2O_3$, $Sm_2O_3$, $Dy_2O_3$, a $Y_2O_3$—$ZrO_2$ solid solution, a ceramic comprising $Y_2Al_4O_9$ and a $Y_2O_3$—$ZrO_2$ solid solution, or combinations thereof. In some embodiments, the coating comprises $Al_2O_3$. In some embodiments, the coating comprises ALD deposited $Al_2O_3$. In some embodiments, the coating comprises multiple layers. In some embodiments, the coating has a thickness of about 10 nanometers to about 500 nanometers, or any sub-range or single value therein.

In the foregoing description, numerous specific details are set forth, such as specific materials, dimensions, processes parameters, etc., to provide a thorough understanding of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is simply intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

Embodiments of the present disclosure have been described with reference to specific exemplary embodiments thereof. The specification and drawings are, accordingly, to be regarded in an illustrative rather than a restrictive sense. Various modifications of the disclosure in addition to those shown and described herein will become apparent to those skilled in the art and are intended to fall within the scope of the appended claims.

As used herein, the singular forms "a," "an," and "the" include plural references unless the context clearly indicates otherwise. Thus, for example, reference to "a wafer" includes a single wafer as well as two or more wafers, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number$\pm 10\%$, such that "about 10" would include from 9 to 11.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

What is claimed is:

1. A slit valve gate comprising:
a base portion configured to couple to a slit valve actuator and comprising a first angled alignment feature, wherein the base portion forms a recess;
a seal portion coupled to the base portion, wherein the base portion forms a receiving area for the seal portion, wherein the first angled alignment feature extends from a bottom of the recess to the receiving area for the seal portion, and wherein the seal portion is configured to create an airtight seal between the slit valve gate and a sealing surface of a slit valve opening; and
a clamp portion coupled to the base portion and comprising a second angled alignment feature extending from a first side of the clamp portion to a second side of the clamp portion, wherein the second angled alignment feature is configured to interface with the first angled alignment feature of the base portion to align the clamp portion with respect to the base portion, wherein the clamp portion retains the seal portion at least partially between the clamp portion and the base portion.

2. The slit valve gate of claim 1, wherein the first angled alignment feature extends around a periphery of the clamp portion.

3. The slit valve gate of claim 1, wherein the recess has an angled edge to accept the clamp portion and form the second angled alignment feature.

4. The slit valve gate of claim 1, further comprising:
a plurality of mechanical fasteners that secure the clamp portion to the base portion.

5. The slit valve gate of claim 4, wherein at least one of the plurality of mechanical fasteners forms a vent feature.

6. The slit valve gate of claim 1, wherein at least one of the clamp portion or the base portion forms a vent feature configured to vent a region formed between the clamp portion and the base portion.

7. The slit valve gate of claim 1, wherein one or more of the base portion or the clamp portion comprise a material selected from a group consisting of aluminum, stainless steel, titanium, ceramic, and plastic.

8. The slit valve gate of claim 1, wherein one or more of the base portion or the clamp portion are coated with a protective coating.

9. The slit valve gate of claim 1, wherein the clamp portion and the base portion form a groove, and wherein at least a portion of the clamp portion retains the seal portion at least partially in the groove.

10. The slit valve gate of claim 9, wherein the groove is a dovetail groove, and wherein a first portion of the dovetail groove is formed by the clamp portion and a second portion of the dovetail groove is formed by the base portion.

11. A slit valve comprising:
a slit valve opening;
a slit valve actuator; and
a slit valve gate coupled to the slit valve actuator, wherein the slit valve gate is configured to seal the slit valve opening responsive to the slit valve actuator moving the slit valve gate to a closed position, wherein the slit valve gate comprises:

a base portion comprising a first angled alignment feature, wherein the slit valve gate is coupled to the slit valve actuator via the base portion, wherein the base portion forms a recess;

a seal portion coupled to the base portion, wherein the base portion forms a receiving area for the seal portion, wherein the first angled alignment feature extends from a bottom of the recess to the receiving area for the seal portion, and wherein the seal portion is configured to create an airtight seal between the slit valve gate and a sealing surface of the slit valve opening responsive to the slit valve actuator moving the slit valve gate to the closed position; and a clamp portion coupled to the base portion and comprising a second angled alignment feature extending from a first side of the clamp portion to a second side of the clamp portion, wherein the second angled alignment feature is configured to interface with the first angled alignment feature of the base portion to align the clamp portion with respect to the base portion, wherein the clamp portion retains the seal portion at least partially between the clamp portion and the base portion.

12. The slit valve of claim 11, wherein the first angled alignment feature extends around a periphery of the clamp portion.

13. The slit valve of claim 11, wherein the recess has an angled edge to accept the clamp portion and form the second angled alignment feature.

14. The slit valve of claim 11, further comprising:

a plurality of mechanical fasteners that secure the clamp portion to the base portion.

15. The slit valve of claim 11, wherein at least one of the clamp portion or the base portion forms a vent feature configured to vent a region formed between the clamp portion and the base portion.

16. The slit valve of claim 11, wherein one or more of the base portion or the clamp portion comprise a material selected from a group consisting of aluminum, stainless steel, titanium, ceramic, or plastic.

17. The slit valve of claim 11, wherein one or more of the base portion or the clamp portion are coated with a protective coating.

18. The slit valve of claim 11, wherein the clamp portion and the base portion form a groove, and wherein at least a portion of the clamp portion retains the seal portion at least partially in the groove, and wherein a first portion of the groove is formed by the clamp portion and a second portion of the groove is formed by the base portion.

19. A slit valve gate, comprising:

a base portion configured to couple to a slit valve actuator and comprising a first angled alignment feature, wherein the base portion forms a recess;

a seal portion coupled to the base portion, wherein the base portion forms a receiving area for the seal portion, wherein the first angled alignment feature extends from a bottom of the recess to the receiving area for the seal portion, and wherein the seal portion is configured to create an airtight seal between the slit valve gate and a sealing surface of a slit valve opening; and a clamp portion coupled to the base portion and comprising a second angled alignment feature extending from a first side of the clamp portion to a second side of the clamp portion, wherein the second angled alignment feature is configured to interface with the first angled alignment feature, wherein the clamp portion retains the seal portion at least partially between the clamp portion and the base portion, and wherein at least one of the clamp portion or the base portion forms one or more first vent features configured to vent a first region formed between the clamp portion and the base portion.

20. The slit valve gate of claim 19, further comprising a plurality of mechanical fasteners that secure the clamp portion to the base portion, wherein at least one of the plurality of mechanical fasteners forms a second vent feature.

* * * * *